US010285412B2

(12) United States Patent
Baumeister et al.

(10) Patent No.: US 10,285,412 B2
(45) Date of Patent: May 14, 2019

(54) METHOD FOR PRODUCING FRESH MILK HAVING A LONGER SHELF LIFE

(71) Applicant: GEA Mechanical Equipment GmbH, Oelde (DE)

(72) Inventors: Egon Baumeister, Oelde (DE); Michael Meyer, Beckum (DE); Heinrich Winkenhoff, Oelde (DE)

(73) Assignee: GEA Mechanical Equipment GmbH, Oelde (DE)

( * ) Notice: Subject to any disclaimer, the term of this patent is extended or adjusted under 35 U.S.C. 154(b) by 0 days.

(21) Appl. No.: 14/226,385

(22) Filed: Mar. 26, 2014

(65) Prior Publication Data
US 2014/0272043 A1 Sep. 18, 2014

Related U.S. Application Data

(63) Continuation of application No. 13/496,030, filed as application No. PCT/EP2010/063511 on Sep. 15, 2010, now abandoned.

(30) Foreign Application Priority Data

Sep. 16, 2009 (DE) .................. 10 2009 044 030

(51) Int. Cl.
*A23C 7/04* (2006.01)
*A23C 9/14* (2006.01)
*A23C 3/033* (2006.01)

(52) U.S. Cl.
CPC .............. *A23C 9/14* (2013.01); *A23C 3/0332* (2013.01); *A23C 7/046* (2013.01); *A23C 2210/252* (2013.01); *A23C 2210/256* (2013.01)

(58) Field of Classification Search
CPC .............. A23C 2210/256; A23C 7/046; A23C 2210/254; A23C 2210/252
See application file for complete search history.

(56) References Cited

U.S. PATENT DOCUMENTS 1,603,726 A   10/1926   Thomsen
2,725,186 A   11/1955   Strezynski
(Continued)

FOREIGN PATENT DOCUMENTS

CN   101396045 A   4/2009
DE   38 26 461 C1   2/1990
(Continued)

OTHER PUBLICATIONS

The Dairy Council, Varieties of Milk, Captured Aug. 13, 2007 <https://web.archive.org/web/20070813211518/http://www.milk.co.uk/page.aspx?intPageID=43>.*
(Continued)

*Primary Examiner* — Viren A Thakur
*Assistant Examiner* — Thanh H Nguyen
(74) *Attorney, Agent, or Firm* — Crowell & Moring LLP

(57) ABSTRACT

A method for producing fresh milk having a longer shelf life involves providing raw milk and performing an at least two-step centrifugal germ removal process of the raw milk before a standardization process of the raw milk is carried out. A method may also include performing a first step of a two-step centrifugal germ removal process before a skimming process separating skimmed milk is carried out and performing a second step of the two-step centrifugal germ removal process during the carrying out of the skimming process separating skimmed milk.

4 Claims, 6 Drawing Sheets

(56) References Cited

U.S. PATENT DOCUMENTS

| | | | |
|---|---|---|---|
| 1,057,286 | A | 2/1967 | Clark |
| 3,525,629 | A | 8/1970 | Kosikowski |
| 4,015,772 | A | 4/1977 | Hemfort |
| 4,695,270 | A | 9/1987 | Zettier |
| 4,876,100 | A | 10/1989 | Holm et al. |
| 5,017,396 | A * | 5/1991 | Lehmann et al. ............ 426/491 |
| 5,683,733 | A * | 11/1997 | Krabsen et al. .............. 426/491 |
| 5,866,804 | A | 2/1999 | O'Keeffe |
| 5,935,632 | A | 8/1999 | Larsen |
| 7,537,559 | B2 * | 5/2009 | Wieking et al. ................ 494/70 |
| 2007/0270298 | A1 | 11/2007 | Wieking et al. |
| 2014/0272043 | A1 | 9/2014 | Baumeister et al. |

FOREIGN PATENT DOCUMENTS

| | | |
|---|---|---|
| DE | 195 03 065 C1 | 11/1995 |
| DE | 100 36 085 C1 | 1/2002 |
| EP | 0 491 135 B1 | 2/1994 |
| EP | 2 477 502 B2 | 8/2013 |
| JP | 2005229825 A | 9/2005 |
| RU | 2 261 610 C1 | 10/2005 |
| RU | 2 261 611 C1 | 10/2005 |
| RU | 2 346 477 C1 | 2/2009 |
| WO | WO 2006/007894 A1 | 1/2006 |
| WO | WO 2006/021059 A1 | 3/2006 |
| WO | WO 2008/058844 A1 | 5/2008 |

OTHER PUBLICATIONS

Dairy Processing Handbook, Tetra Pak, 1995, pp. 104, 110, 115, 231, 293, 294.*

Separator's Digest, The Magazine of GEA Westfalia Separator Group, Edition 2, 2012 IFAT Special, pp. 1-28.

Christian Frahm et al., New Separation Process for Double Bacteria Removal for Longer Shelf Life of Milk, White Paper on GEA Westfalia Separator prolong, pp. 1-15.

Diary Technology Award 2012, GEA Westfalia Separator Group GmbH Oelde (Germany), 2012, 1 page.

Centrifugal separators and milk standardization, Dairy Processing Handbook, Chapter 6.2, 2003, pp. 99-343.

Bactofugation of liquid milks, Milk Industry International, Jan. 1998.

F.V. Kosikowski et al., Microfiltration, Ultrafiltration, and Centrifugation Separation and Sterilization Processes for Improving Milk and Cheese Quality, 1990 J. Diary Sci 73:1411-1419.

Josef Rollie, The Use of Centrifuges to Remove Bacteria, Food Review Jun./Jul. 1986, pp. 15-16.

G. Waes et al., Prevention of Butyric Acid Fermentation by Bacterial Centrifugation of the Cheese Milk, Bulletin of the IDF 251, Chapter 6, pp. 47-50.

Goran Sillen et al., Removal of spores and bacteria with bactofuges: Microbiological quality of milk improved, AFLA Laval Separation AB, Die Emaehrungsindustrie, Mar. 1996, pp. 1-5.

Goran Sillen et al., Modem Bactofuges in the service of the dairy industry, vol. 107, issue 25, Jun. 19, 1986, 20 pages in German, including an English translation.

https://en.wikipedia.org/wiki/Milk, Sep. 13, 2016, pp. 1-14 in German, including an English translation.

Interlocutory decision in Opposition proceedings, (Art. 101 (3) (a) and 106(2)(EPC), dated Feb. 19, 2016, issued by European Patent Office, Application No. 10 754 494.2-1358 / 2477 502, 38 pages, including an English translation (35 pages).

Dairy Processing Handbook, 2003, Chapter 8, pp. 213-226.

Dairy Processing Handbook, 2003, Chapter 9, pp. 227-245.

Indian-language Office Action issued in counterpart Indian Application No. 3225/CHENP/2012 dated Jul. 20, 2018 with partial English translation (one (1) page).

Walstrap, P. et al., "Dairy Science and Technology", Food and Science Technology, Taylor & Francis Group, 2006, pp. 276-277, vol. 2, Boca Raton, Fl, (nine (9) pp.).

* cited by examiner

METHOD FOR PRODUCING FRESH MILK HAVING A LONGER SHELF LIFE

CROSS REFERENCE TO RELATED APPLICATION

This application is a continuation of U.S. application Ser. No. 13/496,030, filed Apr. 5, 2012, which is a National Stage application of PCT International Application PCT/EP2010/063511, filed Sep. 15, 2010, which claims priority under 35 U.S.C. § 119 to German Patent Application No. 10 2009 044 030.5, filed Sep. 16, 2009, the disclosures of which are expressly incorporated by reference herein.

BACKGROUND AND SUMMARY

The present disclosure relates to a method for producing fresh milk having a longer shelf life.

In a general method for producing drinking milk, see FIG. 1, raw milk is first heated to a preset skimming temperature. This can be, for example, between 55 and 62° C., in order to prevent protein damage.

After the skimming, that is to say separating the raw milk into cream and skimmed milk, the cream is homogenized.

Then the skimmed milk is optionally standardized by adding a predetermined amount of homogenized cream.

Hereafter, the standardized and homogenized milk must be pasteurized at a temperature between 72° C. and 75° C. and for a treatment time of 15 seconds to 30 seconds. In this step, spoilage-relevant germs are killed.

Finally, the milk is cooled to a temperature of 6-7° C. Such a method of production, with aseptic packaging, ensures a shelf life of up to 12 days.

In addition, a great variety of methods are known which ensure an extended shelf life of milk. Usually, high-temperature heat-treated milk, however, exhibits significant taste differences compared with fresh milk.

For instance, what is termed extended shelf life, or ESL, milk is known which has a shelf life of at least 20 days at storage temperatures T≤8° C.

An important precondition for a longer shelf life of milk is a great germ reduction of spore formers and a reduction of the total germ count. These accelerate the spoilage of milk to a great extent.

Known methods which are used in the production of ESL milk are described hereinafter.

ESL Direct Heating System:

As starting product, standardized and thermally treated milk or only fat-standardized milk is provided in a store.

In the direct heating system, the product is regeneratively heated to 70° C. to 85° C. and then heated to a maximum of 127° C. by direct steam injection. After hot-holding the milk for 3 seconds, it is cooled in a flash cooler to 70° C. to 85° C. Aseptic homogenization at 70° C. then follows.

ESL Indirect Heating System:

As starting product, the same product as in the direct heating is provided in a store. The milk is regeneratively heated to 70° C. and then septically homogenized. The product is then heated to 105° C. to 107° C. in the regenerative heat exchanger and heated in the heater section to 127° C. for 2 seconds.

ESL Microfiltration:

The raw milk here is separated at the usual skimming temperature of 55° C. The skimmed milk is then microfiltered likewise at 55° C. The cream can be heated with the retentate in the course of 6 seconds to 105° C. to 125° C. and mixed with the skimmed milk and homogenized. The milk is then pasteurized and cooled to 4° C. to 6° C.

Membranes having pore sizes of 0.8 µm to 1.4 µm are used which are said to guarantee a germ retention greater than 99.5%. This produces a low-germ permeate and a high-germ retentate. The germ concentrate, or retentate, can be concentrated and after a high-temperature heat treatment can be recirculated to the permeate.

ESL Deep-Bed Filtration:

In this method, filter candles made of polypropylene are used. The pore size of the prefilter is 0.3 µm and that of the main filter 0.2 µm. The filtration proceeds at separation temperature and the germs are separated in the depth of the filter without forming retentate. The method sequence of the heating system corresponds to that of the microfiltration.

The product of the method presented is organoleptically comparable with conventionally pasteurized milk. The removal of germs from milk by microfiltration for the purpose of extending shelf life has proved, in principle, to be particularly suitable.

DE 100 36 085 C1 discloses a method for removing germs from milk, in particular in the production of milk for cheese making. For removing germs from milk, the milk is separated into skimmed milk and cream in a separator. Then germs are removed from the skimmed milk by microfiltration or a separator.

U.S. Pat. No. 3,525,629 A discloses a method for sterilizing milk for cheese making. In this method, a bacteria-containing milk slurry is separated off from the milk in a two-step centrifugal method, sterilized, and recirculated to the milk circuit. Such a milk, however, cannot be termed fresh milk.

A two-step centrifugal germ removal is also disclosed in the article "Neuer Stern in der Milchstrasse", translated as "New star in the milky way", by Iloi Wasen, Deutsche Molkerei Zeitung, 2003, pp. 40/41. However, specific method sequences are not disclosed in the article.

The document "Separatoren fur Milch-Reinigung and Milch-Entkeimung", translated as "Separators for milk purification and removal of germs from milk", by Hanno R. Lehmann and Ernst Dolle as scientific document No. 12 Westfalia Separator AG, Oelde, 1st edition, 1986. FIG. 20 and chapter 3.1.2 disclose two-step removal of germs from skimmed milk. This has the disadvantage that the cream fraction either has a high fraction of spores or, on account of heating, only has a low fraction of β-lactoglobulin.

The present disclosure relates to proceeding from the previous prior art and providing a method for producing fresh milk having a longer shelf life. The embodiments, according to the present disclosure, provide for a method in which no high-temperature heat treatment of the milk or of milk components is necessary.

The present disclosure thus relates to a method for producing fresh milk having a longer shelf life. The method steps include: providing raw milk; and performing an at least two-step centrifugal germ removal process of the raw milk before a standardization process of the raw milk is carried out. The present disclosure also relates to a method for producing fresh milk having a longer shelf life, the method steps including: providing raw milk; performing a first step of a two-step centrifugal germ removal process before a skimming process separating skimmed milk is carried out, and performing a second step of the two-step centrifugal germ removal process during the carrying out of the skimming process separating skimmed milk. The present disclosure also relates to a method of a method for producing fresh milk having a longer shelf life, the method steps comprising:

providing whole milk; performing an at least two-step centrifugal germ removal process after a standardization process of the whole milk is carried out.

Thus, in the embodiments of the present disclosure, advantageously, germs are also removed from the cream contained in the fresh milk once, or, also advantageously, twice.

Embodiments of the method of the present disclosure are further discussed and disclosed herein and in the accompanying drawings and claims.

By using an at least two-step centrifugal removal of germs, it is possible to dispense with not only a filtration but also a heating to temperatures of about 125° C. of the raw milk before separation or of the drinking milk after standardization.

The at least two-step centrifugal removal of germs effects a high germ reduction of spoilage-relevant spore formers. For instance, in one liter of milk after the two-step centrifugal germ reduction, at most 1 *Bacillus cereus* spore per 10 ml of liquid from which germs have been removed, or fewer of these spores, is detectable. Precisely this aerobic spore former increases a hundred fold in a period of 6 days and impairs to a great extent the shelf life of the milk owing to sweet curdling. In this manner, a milk having a longer shelf life is provided which has a shelf life at a storage temperature T≤8° C. in any case up to 21 days and in which it is no longer necessary to add high-temperature heat-treated material in the production. Although an extreme shelf life of 40 days or more is not necessarily achieved, compared with conventional fresh milk, the markedly increased shelf life period of a minimum of 20 days or more, in accordance with the present disclosure, provides a milk having extended shelf life which is not subject to any flavor impairments owing to high-temperature heat treatment. Even the cream does not need to be high-temperature heat treated, but can be if desired.

The lactulose content achieved in the fresh milk having an extended shelf life produced according to the present disclosure, and the content of β-lactoglobulin are comparable with the corresponding contents in fresh milk.

The minimization of germ-rich concentrate, which is removed via the discontinuous emptyings of the separator drum, may, according to the present disclosure, be achieved by using a PRO+ system. That is to say, a system of the type of EP1786565 having fin bodies which are arranged radially outside a disk package of a separator. Thus, it is possible to discharge very small amounts of concentrate arising in a very large emptying interval.

The at least two-stage centrifugal germ removal, in accordance with the present disclosure, can, in addition to the step of skimming, be integrated at various sites into a method for preserving fresh milk. The germ removal steps need not follow one another.

By an additional separation of solids off from the milk during the skimming, likewise a certain discharge of germs from the milk can be effected already. The skimming step, however, is, in this context, only to be considered as a type of preliminary germ removal, but not as a complete germ removal step.

Germ removal, in this context, of the present disclosure, means the targeted treatment of milk or skimmed milk for clarifying from solids, such as germs, spores, bacteria and the like, which includes using a separator, for example, a disk separator.

In this germ removal the liquid phase, or the influent milk, is clarified from solids centrifugally. It is within the scope of the present disclosure to recirculate a substream of the liquid that is clarified in this manner to the feed of the germ removal separator, in order, for example, to further optimize the germ removal effect.

By integrating an at least two-step centrifugal germ removal into the abovementioned production method, an advantageous extension of the shelf life of the milk to a minimum of 20 days can be achieved in accordance with the present disclosure.

It is advantageous when the at least two germ removal steps are already carried out successively before the skimming, that the number of the aerobic germ formers in question has already been drastically lowered, before the various heating processes of, for example, the process steps described herein, to a value below the limit of detection.

In a further embodiment according to the present disclosure, at least one germ removal step can proceed already before the skimming, whereas a second germ removal step is integrated into the method during processing of the skimmed milk.

In a further embodiment according to the present disclosure, germs can be removed from the whole milk in two successive centrifugal steps after standardization. That is to say, after feeding an amount of cream to the skimmed milk.

Whereas the first centrifugal germ removal lowers the number of the corresponding aerobic spore formers by up to 90%, in the later course a separate germ removal from the skimmed milk can proceed in a further centrifugal germ removal step.

To ensure freedom from germs, in this embodiment, it is advantageous if, after the separation step of skimming, the cream is briefly heated to a temperature, for example, of between 100 and 140° C. This is not only to ensure freedom of the cream from germs, but also of the skimmed milk after remixing.

Since freedom of the cream from germs is advantageous in the storage of excess cream, the cream can be heated briefly immediately after the skimming and before the quantitative division, such that germs are also removed from the excess cream.

To ensure freedom from germs during storage of the fresh milk having a longer shelf life, an aseptic packaging, that is known, is advantageous.

Embodiments and working examples, according to the present disclosure, are further discussed herein.

Other aspects of the present disclosure will become apparent from the following descriptions when considered in conjunction with the accompanying drawings.

DETAILED DESCRIPTION

Figure 1:
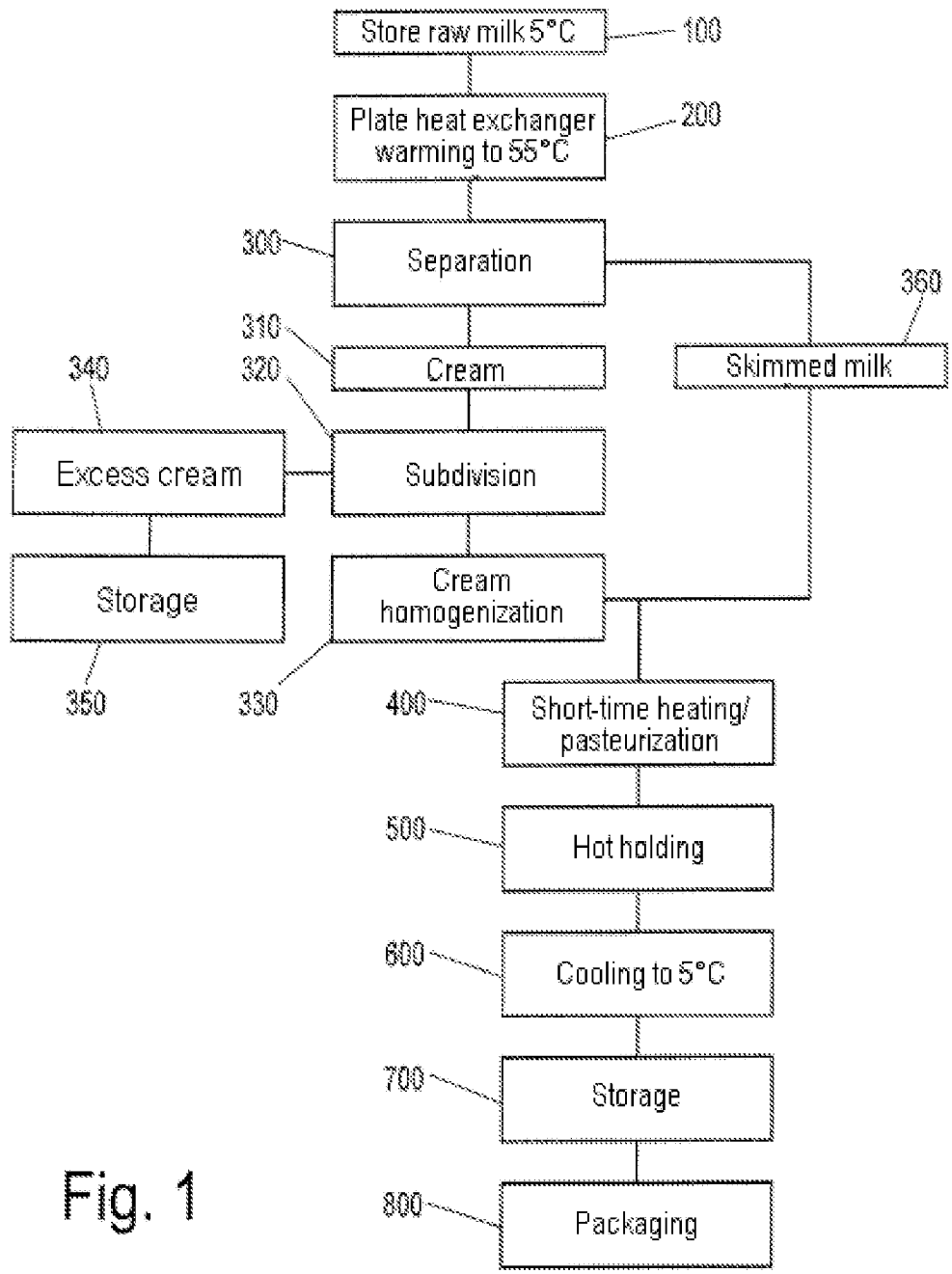
FIG. 1 shows a schematic sequence of a method for producing fresh milk.

FIG. 1 shows a flow chart of a known production process for producing fresh milk.

Stored raw milk 100 at a temperature of 2-8° C. is warmed or warmed up using a plate heat exchanger in step 200 to a skimming temperature of 50-60° C., for example, 55° C. Then, the raw milk is centrifugally separated in a separator into cream 310 and skimmed milk 360 in step 300. Or, the milk is skimmed. The cream 310 is then, according to the desired cream content of the milk, divided in step 320, where excess cream, step 340, can be stored, step 350, if desired. Then, the cream is homogenized in step 330 in such a manner that a breakdown of fat balls for stability against creaming results.

The skimmed milk, step 360, is then mixed with the desired amount of cream, standardized, and in step 400 warmed or short-time heated to a temperature of 70-80° C., or for example, 74° C. That is done by way of a plate heat exchanger, and in step 500 kept hot for a correspondingly long time. At this temperature, spoilage-relevant microorganisms are to be destroyed and unwanted enzymes inactivated.

For reduction of germ growth, the milk is then cooled, for example, using a plate heat exchanger, step 600, down to 4-6° C., or for example, 5° C., for storage, step 700. Aseptic packaging of the milk, step 800, in bottles or in aseptic drinking cartons and consumption of the packaged milk is possible in the course of 12 days.

Figure 2:
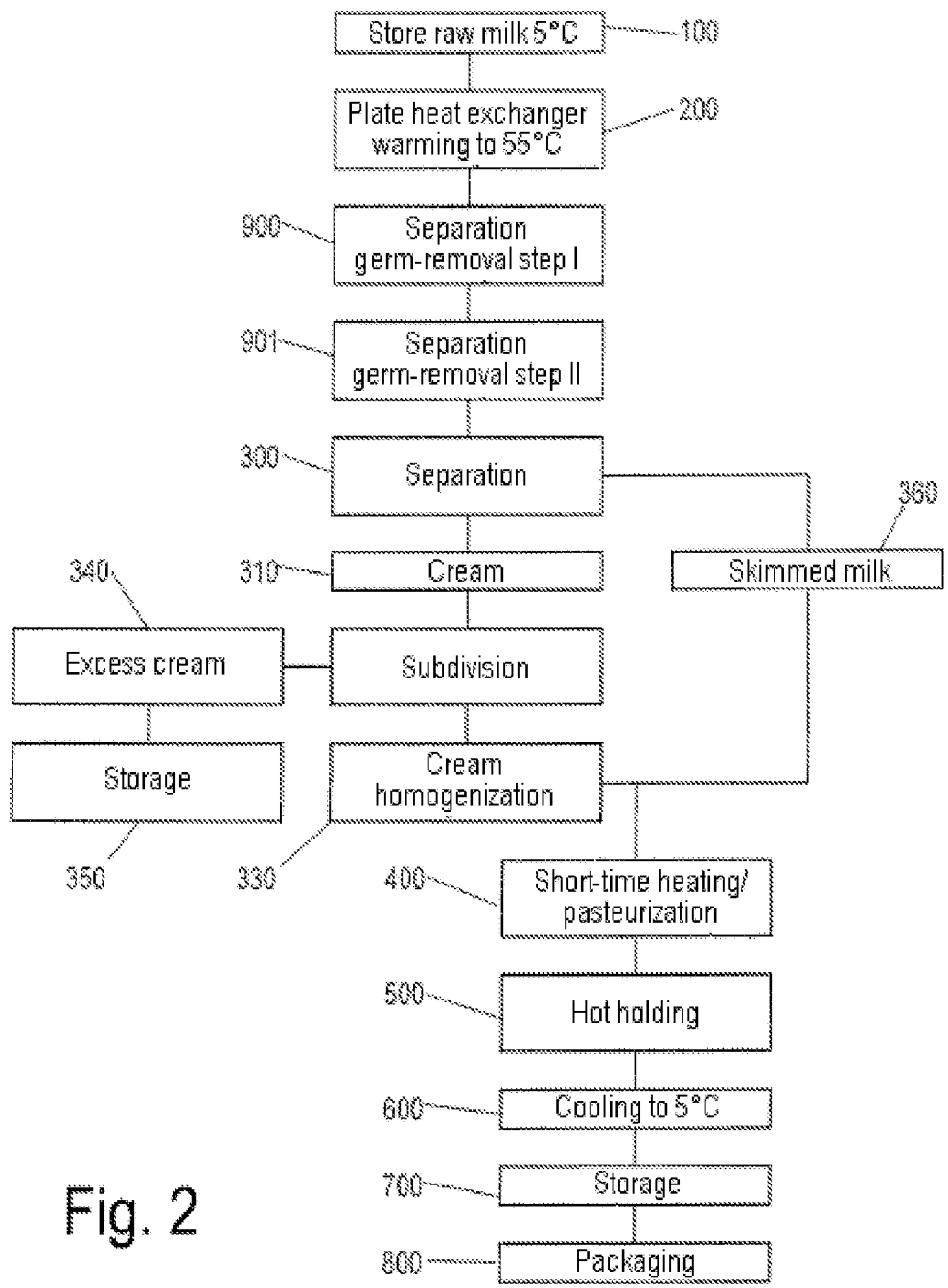
FIG. 2 shows a schematic sequence of a first embodiment, according to the present disclosure, of a method for producing fresh milk having a longer shelf life.

FIG. 2 is a flow chart showing, in addition to the previously known steps, two germ reduction steps, 900, 901, that are added in accordance with an embodiment of a method of the present disclosure. These two germ reduction steps are integrated into the process before the skimming, or before skimming of the raw milk, step 300.

In this embodiment, after heating to a separation temperature of 50-60° C., or for example, 55° C., step 200, the raw milk is freed from bacteria and spores in the two germ-removal steps 900 and 901. Already before the skimming step, a germ removal, or removal of germs from the milk, is thereby carried out at, for example, 55° C.

Therefore, on skimming, not only is substantially spore-free cream, step 310, but also germ-free skimmed milk, step 360, are thereby obtained. The cream in the later course can be added back to the skimmed milk for standardization. Pasteurization of the drinking milk after standardization can proceed, in this embodiment, at 74-85° C., or for example, at 80° C., such that remaining spoilage-relevant microorganisms and unwanted enzymes can be correspondingly destroyed or inactivated.

Figure 3:
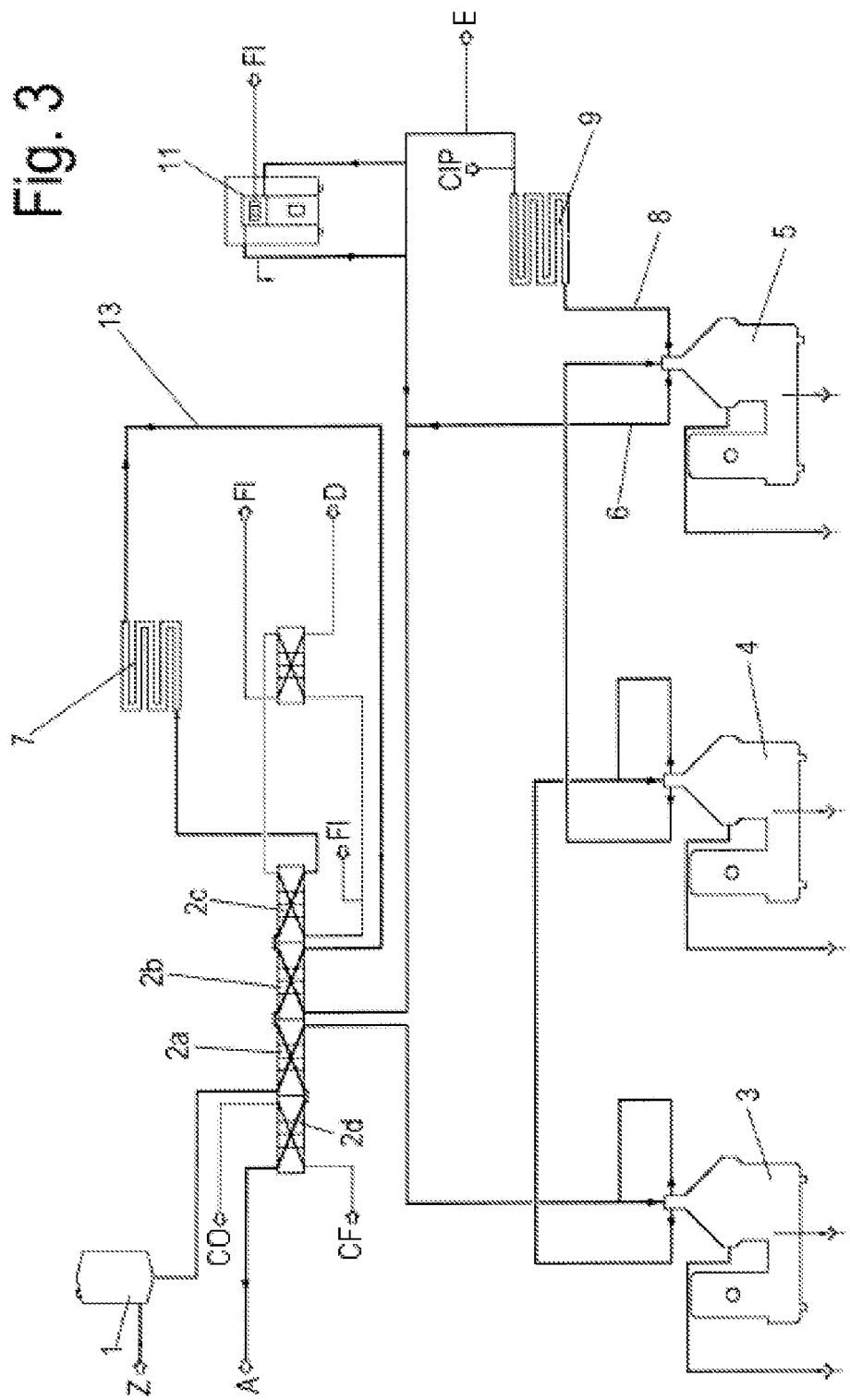
FIG. 3 shows a simplified circuit diagram of an arrangement for operating the first embodiment of FIG. 2.

FIG. 3 shows the circuit diagram of a plant which is operated according to the flow chart shown in FIG. 2. In this embodiment, raw milk passes via a feed Z into a storage tank 1 in which the raw milk is stored at, for example, 4-6° C. From the storage tank 1, the raw milk is passed via subsection 2a of a countercurrent-flow plate heat exchanger 2, where the raw milk is warmed to a temperature of 50-60° C., or for example, 55° C.

The raw milk is then transferred at this temperature into a first germ-removal separator 3. In this step, there is a coarse germ removal from the milk, wherein the number of spoilage-relevant spore formers can be reduced by about 90%.

After the coarse germ removal, the raw milk is transferred into a second germ removal separator 4. In this second germ removal step, germs are reliably cleared in such a manner that at least *Bacillus cereus* spores are no longer detectable.

The raw milk from which germs have been removed is then skimmed by a skimming separator 5 in which the raw milk is separated into cream and skimmed milk.

The cream leaves the skimming separator 5 via the line 8 and can be kept at, for example, 74° C. by the heat exchanger 9. Alternatively, within the scope of the present disclosure, the heat exchanger 9 can heat the cream to a temperature of 110-140° C., or for example, 125° C., in order in this manner, to connect an additional thermal post-removal of germs. Optionally, in accordance with the present disclosure, a cleaning-in-process, or CIP, of the plant can proceed via a separate feed line.

By way of a valve (not shown), a quantitative division of the cream proceeds, wherein some of the cream can be removed from the process as excess cream E and stored. Alternatively, within the scope of the present disclosure, further additional cream can be fed to the process. After the amount of cream is set to a predetermined value, the cream is passed into a homogenizer 11. The cream is then recirculated to the skimmed milk via a valve (not shown).

This process, also termed standardization, takes place in a connection piece (not shown) as a connection of the skimmed milk line to the cream line.

The standardized fresh milk is then fed via a line to the plate heat exchanger 2 where it is warmed up on passage from for, example, 55° C., see section 2b to, for example, 74° C., see section 2c. For heating the milk, in the present embodiment, steam D is used, which introduces the required heat input in countercurrent by condensation. The milk, for hot holding, is then passed via a further heat exchanger 7. The heating to, for example, 74° C. introduces a mild inactivation of spore formers.

The standardized fresh milk, at, for example, $T_{milk}$=approximately 74° C., is then in section 2c of the plate heat exchanger. Then, via the section 2b, where $T_{milk}$=approximately 55° C., section 2a, where $T_{milk}$=approximately 8° C., and section 2d, where $T_{milk}$=approximately 4° C., cooled down to a temperature of 4-6° C. Section 2d, according to the present disclosure, can be designed as ice cooling using a coolant feed CF and a coolant outlet CO. Via an outlet A, the fresh milk that now has a longer shelf life is passed onto an aseptic packaging system. Corresponding measurement and control devices for parameters, such as, for example, pressure, germ count, cell count, temperature, motor power of the separators, have not been shown in the FIG. 3 circuit diagram for the sake of clarity.

Figure 4A:
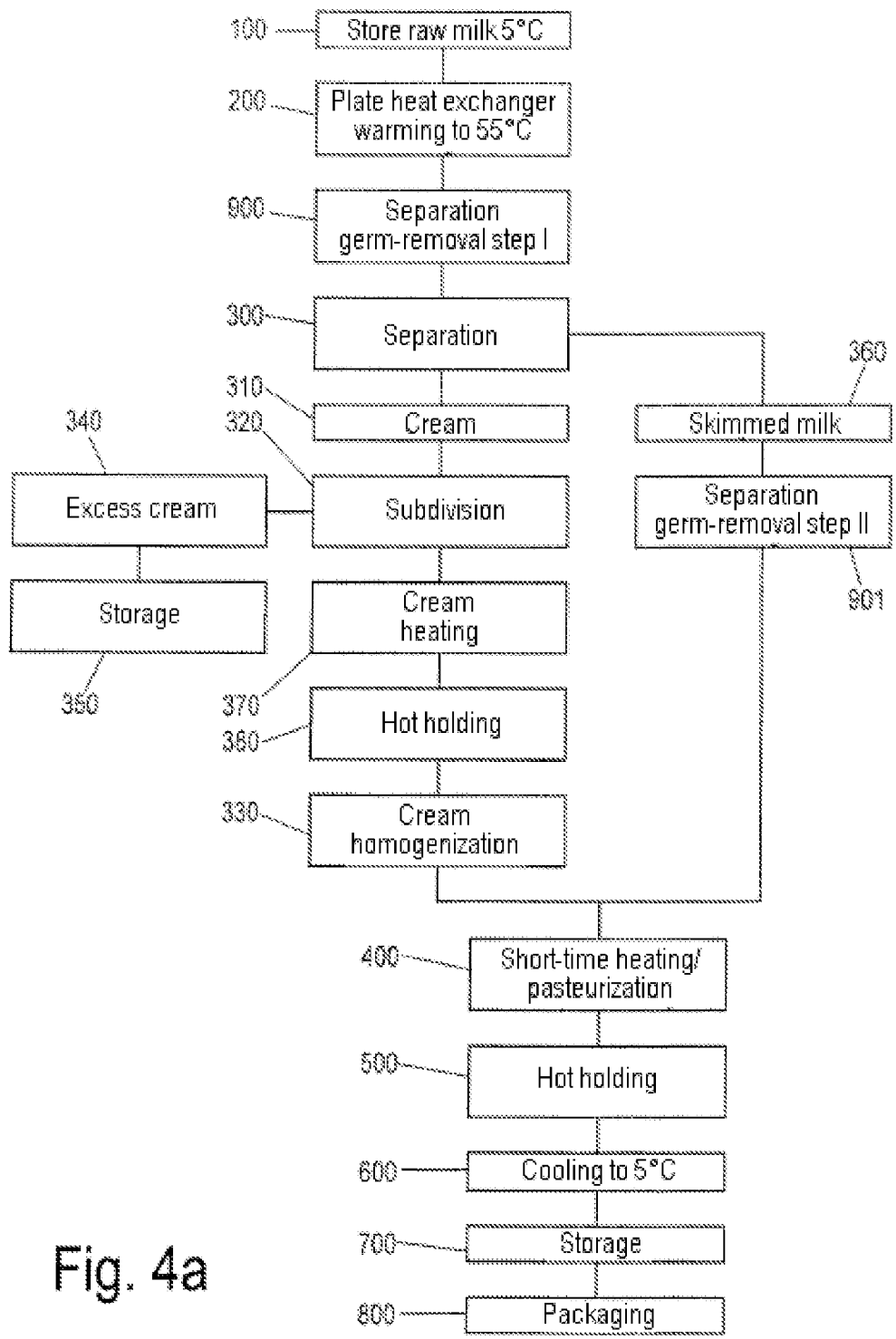
FIGS. 4*a*, 4*b* show schematic sequences of two embodiments according to the present disclosure, of a method for producing fresh milk having a longer shelf life.
Figure 4B:
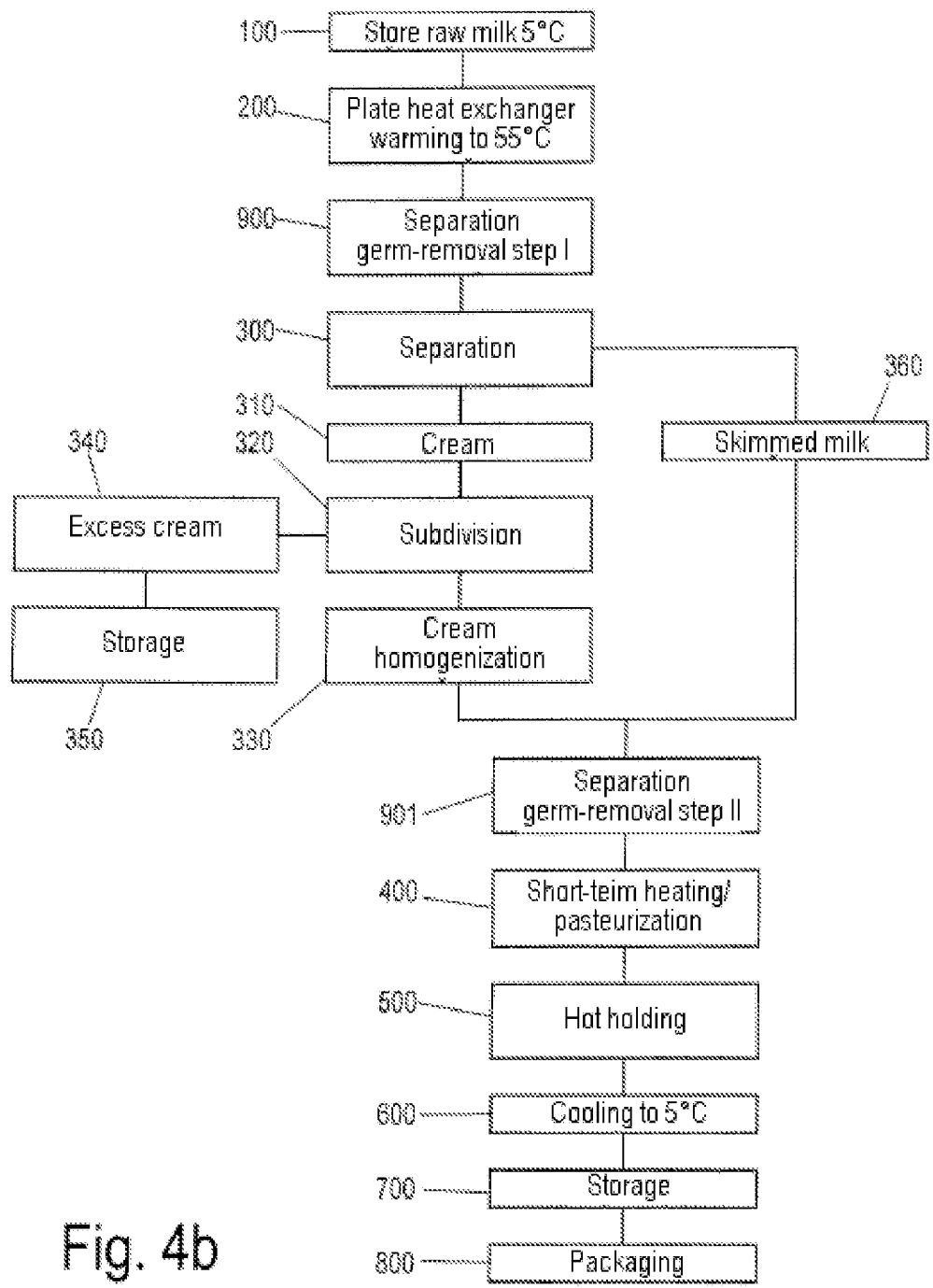

In FIGS. 4a, 4b, the two germ-removal steps 900, 901 occur at various sites of the process sequence and are integrated therein. Whereas, in FIG. 4a the first germ removal 900 proceeds before the skimming 300 or the separation of the raw milk into cream, step 310, and skimmed milk, step 360, the germ-removal step 901 serves for removing germs from skimmed milk, step 360. The cream that is separated off, subsequently to the skimming step, is additionally heated to, for example, 125° C. in order to ensure in this manner freedom of the cream from germs.

After the excess cream, step 340, has been separated off, step 320, a predetermined amount of cream is fed to the germ-free skimmed milk 360. Then, the drinking milk is again warmed up, step 400, in order to inactivate any remaining spoilage-relevant microorganisms or enzymes. A hot holding step 500 then follows and also a cooling process, step 600, in such a manner that the resultant drinking milk can be stored and packaged at a temperature of, for example, 5° C. or below.

In the example of FIG. 4a, therefore, a first germ removal from the raw milk proceeds before the separation and a second germ removal from the skimmed milk after the separation of cream and skimmed milk. Therefore, germs are removed separately from both components of fresh milk, cream and skimmed milk, in this process.

Alternatively, it is within the scope of the present disclosure, not to give the homogenized cream a high-temperature heat treatment but to pass it, after the homogenization, back into the skimmed milk for standardization and then to subject this mixture of skimmed milk and cream together to a second germ removal 901. This can then be followed again by the steps 400 to 800 for final processing of the packaged fresh milk (see FIG. 4b).

Figure 5:
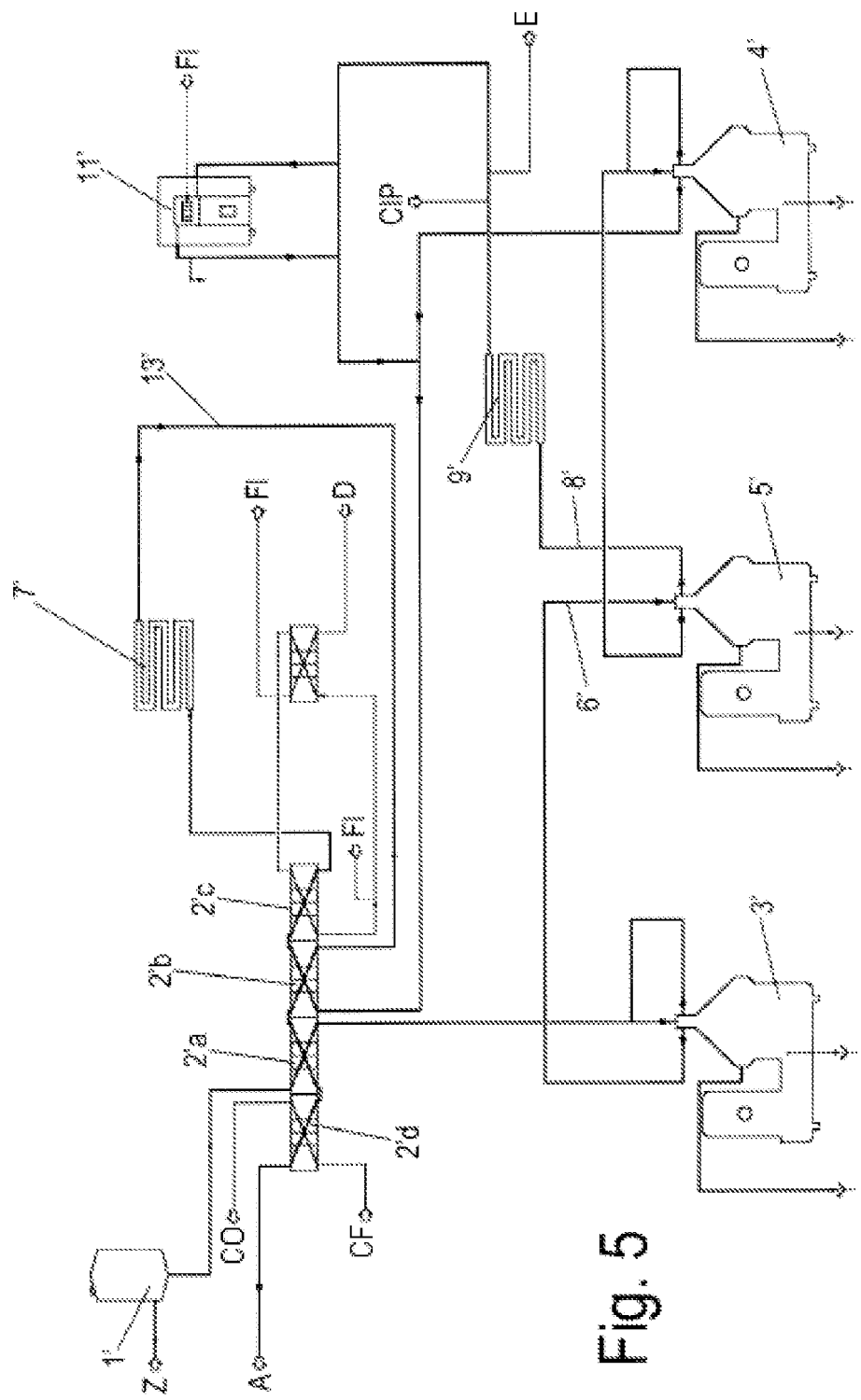
FIG. 5 shows a simplified circuit diagram of an arrangement for operating the embodiment of FIG. 4*a*.

FIG. 5 shows the circuit diagram of a system which is operated according to the schematic shown in FIG. 4a. In this embodiment, the raw milk, analogously to FIG. 3, is warmed to 55° C. in a plate heat exchanger 2' and then subjected to coarse germ removal in a germ removal separator 3'.

In contrast to the working example of FIG. 3, the raw milk from which germs have been removed is skimmed by a skimming separator 5' after the first germ removal step.

After skimming, the skimmed milk is passed into a second germ removal separator 4' where the skimmed milk is again subjected to germ removal, separately from the cream.

The remaining process steps are achieved in a manner similar to FIG. 3 in terms of apparatus.

Compared with the methods of treatment in the pasteurization of "traditionally produced fresh milk", in the production of fresh milk having a longer shelf life, in accordance with the present disclosure, greater demands are made of the quality of the raw milk, the processing, with respect to purity, and of storage, with respect to cooling. For instance, for packaging, primarily aseptic packaging comes into consideration. The raw milk should be of the highest quality and generally not older than 48 hours.

Alternatively, to the three embodiments of the present disclosure shown, a two-step centrifugal germ removal after standardization of the milk is with the scope of the present disclosure. For this purpose, for example, as skimming separator, the applicant's model MSE 230-01-777 comes into consideration, and as germ-removal separators, the model CND-215-01-076, additionally converted to a PRO+ system, as described in E1786565, and the model CSE-230-01-777, come into consideration. As germ-removal and skimming separators, continuously operating self-emptying disk separators are, for example, utilized.

In this embodiment, a previously conventional Pasteur system can be retrofitted without problems with two additional germ-removal separators and corresponding heating and cooling devices for cream, in accordance with the present disclosure.

The phase of bacteria and possibly a fraction of milk removed in the embodiment of the method according to the present disclosure, may be subsequently discarded. Sterilization of this phase by heating, that is to say destroying the bacteria and recirculation of such a sterilized phase to the fresh milk from which germs have been removed may not be preferred, since this adversely affects the quality of the fresh milk, in particular the content thereof of β-lactoglobulin and lactulose.

β-Lactoglobulin is a whey protein which occurs in cow's milk. A high content of β-lactoglobulin is an indicator of high milk quality. In the heating of the milk, denaturation of the milk protein occurs and consequently a lower content of whey proteins, and so also of β-lactoglobulin.

Lactulose is a byproduct of a rearrangement reaction of lactose which proceeds on heat treatment. Lactulose acts as a laxative and cannot be used by the human body. Lactulose is not present in raw milk. Therefore, a low lactulose content is an indicator of freshness and quality of the milk.

Hereinafter, some guide values are listed for lactulose content and β-lactoglobulin content from the directive 92/46/EEC of the Council of the European Community. In addition, a proposal of the German Federal Ministry for Nutrition and Food (BFEL) for the β-lactoglobulin content in various processed milk varieties is given.

| Product | EU Proposal (92/46/EEC) | | Proposal of BEFL |
|---|---|---|---|
| Sterilized Milk | Lower limit | >600 mg lactulose/l | — |
| | Lower limit | <50 mg β-lactoglobulin/l | |
| | Upper limit | | <1200 mg lactulose/l |
| UHT Milk | Lower limit | >100 mg lactulose/l | |
| | Upper Limit | <50 mg β-lactoglobulin/l | >400 mg lactulose/l |
| | Lower limit | Peroxidase negative | Peroxidase negative |
| High-temperature heat treated milk | Upper Limit | <50 mg lactulose/l | >2000 mg β-lactoglobulin/l |
| | Upper Limit | >2000 mg β-lactoglobulin/l | |
| | Lower Limit | Phosphatase negative | Phosphatase negative |
| Pasteurized milk | Upper Limit | Peroxidase positive | Peroxidase positive |
| | Upper Limit | Lactulose not detectable | |
| | Upper Limit | >2600 mg β-lactoglobulin/l | >3000 mg β-lactoglobulin/l |

In the table listed above, sterilized milk, ultraheat-treated milk (UHT), high-temperature heat-treated milk and pasteurized milk are compared and guide values for the individual varieties are stated in order to enable a definition of individual milk varieties and to avoid the risk of confusion on the part of the consumer. In this case, a pasteurized milk may be made equivalent to a traditionally produced fresh milk, wherein the processing method is shown in FIG. 1.

Hereinafter, individual measured values of a pasteurized milk from raw milk, from which germs are removed and which was treated according to an embodiment of the method of the present disclosure, according to FIG. 2 are compared with the measured values of a microfiltered milk or direct-heated milk.

In this case, the classification of a pasteurized milk is guided by the guide values stated in the table above for lactulose and β-lactoglobulin.

| Product | Values | Category |
|---|---|---|
| Pasteurized milk made from raw milk from which germs were removed | 3810 mg/l β-lactoglobulin 5 mg/l lactulose | Pasteurized milk |

| Product | Values | Category |
| --- | --- | --- |
| ESL milk produced by filtration | 3980 mg/l β-lactoglobulin<br>9 mg/l lactulose | Still pasteurized milk |
| ESL milk produced by direct heating | 1490 mg/l β-lactoglobulin<br>26 mg/l | High-temperature heat-treated milk |

As can be seen from the measured values, the pasteurized milk produced from raw milk from which germs were removed is equivalent in quality to pasteurized milk, or traditionally produced fresh milk.

Although the present disclosure has been described and illustrated in detail, it is to be clearly understood that this is done by way of illustration and example only and is not to be taken by way of limitation. The scope of the present disclosure is to be limited only by the terms of the appended claims.

We claim:

1. A method for producing milk having a shelf life of at least 20 days when stored at a temperature of less than or equal to 8° C., the method steps comprising:
   (1) providing raw milk;
   (2) performing a first step of a two-step centrifugal germ removal process;
   (3) performing a standardization process of the raw milk, after the first step of the two-step centrifugal germ removal process, wherein during the standardization process a skimming process occurs with a skimming separator in order to separate the milk into skimmed milk and cream, and
   (4) performing a second step of the two-step centrifugal germ removal process with the skimmed milk after the separation of the milk into cream and skimmed milk during the standardization process,
   wherein each of the at least two steps of the two-step centrifugal germ removal step of step (2) and step (4) is performed with a respective germ removal centrifuge each including a separator having a disk stack made of separation disks, wherein the separator includes fins arranged radially outside the separation disks in a drum of the separator,
   wherein for each of the at least two centrifugal germ removal steps of step (2) and step (4) there is a recirculation of a substream of clarified liquid withdrawn from the respective germ removal centrifuge to the feed of the respective germ removal centrifuge;
   wherein the germ removal in the at least two-step centrifugal germ removal steps of step (2) and step (4) is sufficient such that the milk shelf life is at least 20 days when stored at a storage temperature of less than or equal to 8° C.;
   wherein following step (4), at most 1 *Bacillus cereus* spore per 10 ml of liquid from which germs have been removed, or fewer of these spores, is detectable; and
   wherein no sterilized material is added into the milk at any step of the method.

2. The method as claimed in claim 1, further comprising the steps of:
   prior to step (2), heating the milk to a predetermined skimming temperature;
   following step (3), heating the standardized milk;
   then cooling the standardized milk; and
   then packaging the standardized milk;
   wherein an amount of cream is divided out from the cream portion generated in the skimming process on the basis of predetermined guide values; and
   wherein the standardization process of step (3) is performed by mixing the skimmed milk and an homogenized cream which includes at least a portion of the divided-out amount of cream to produce a standardized milk having a predetermined standardized cream concentration.

3. The method as claimed in claim 2, further comprising the step of:
   heating the cream portion for germ removal after the skimming of the milk.

4. The method as claimed in claim 3, wherein the heating of cream portion step is performed after the skimming of the milk and before the step of dividing out of the amount of cream.

* * * * *